Aug. 8, 1967  S. J. WHITTAKER ETAL  3,335,064
COBALT CONTROL ROD
Filed Sept. 28, 1964  3 Sheets-Sheet 2
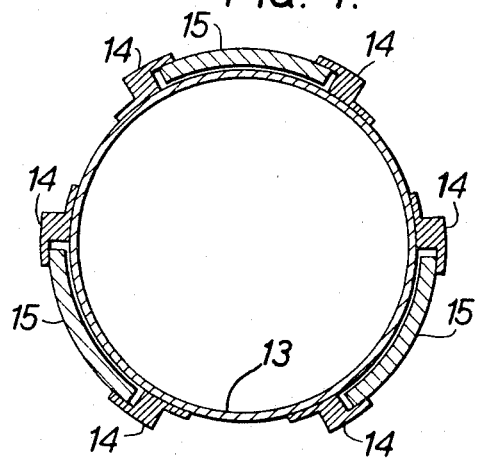
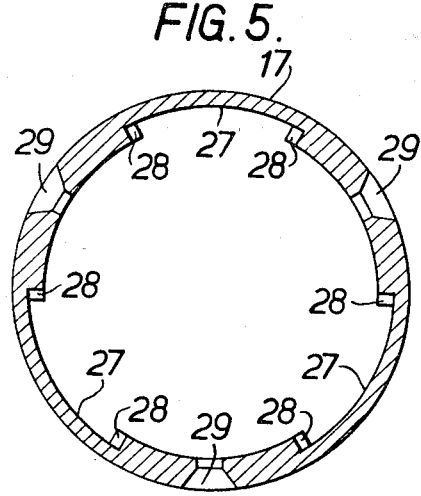
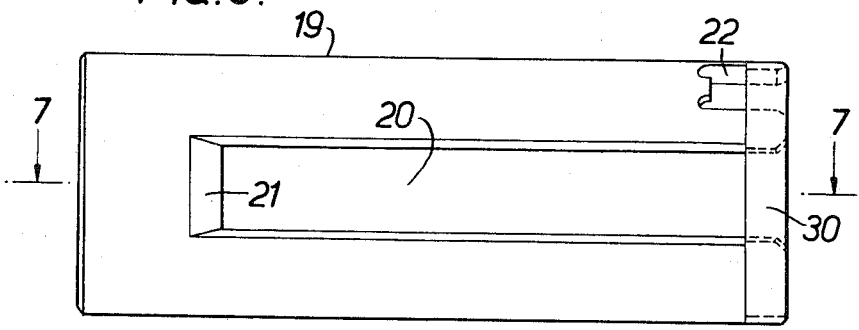

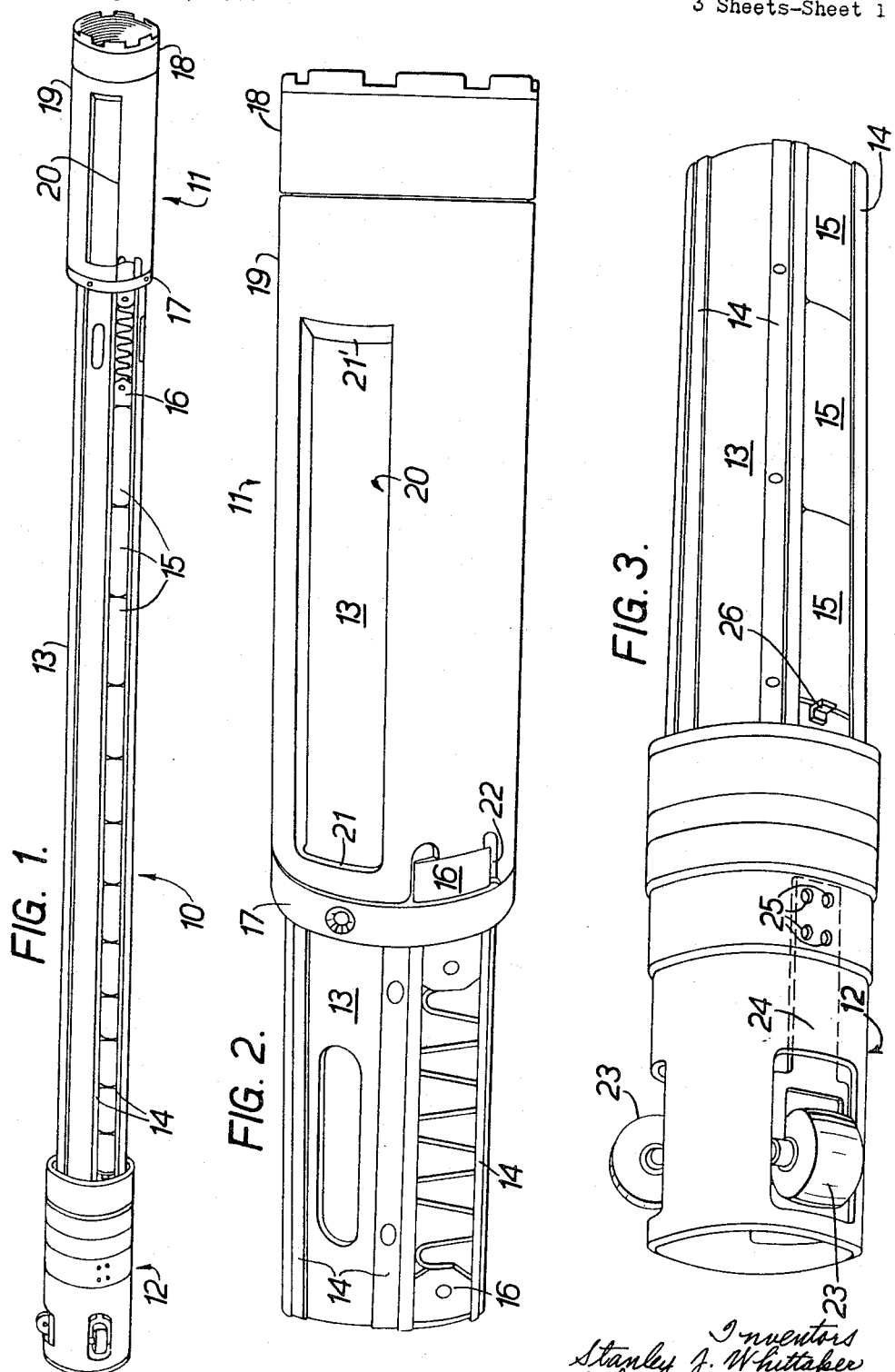

Aug. 8, 1967  S. J. WHITTAKER ET AL  3,335,064
COBALT CONTROL ROD
Filed Sept. 28, 1964  3 Sheets-Sheet 3
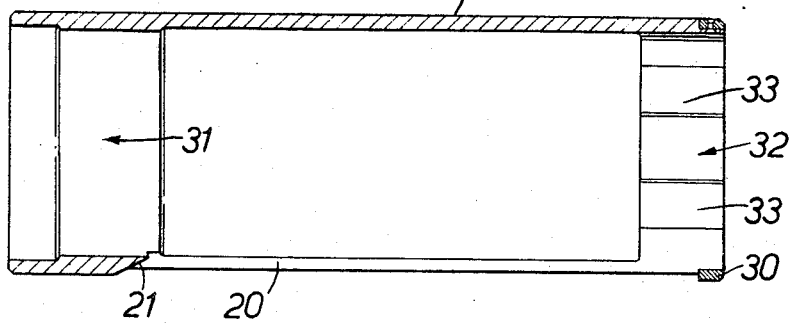
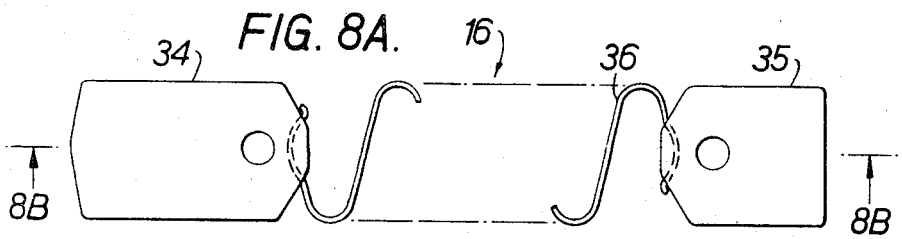
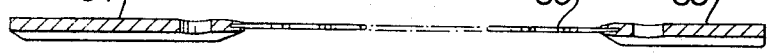
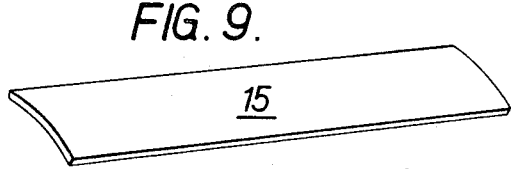
Inventors
Stanley J. Whittaker
John J. Lipsett
By Cushman, Darby & Cushman
Attorneys

United States Patent Office 3,335,064
Patented Aug. 8, 1967

3,335,064
COBALT CONTROL ROD
Stanley J. Whittaker and John J. Lipsett, Deep River, Ontario, Canada, assignors to Atomic Energy of Canada Limited
Filed Sept. 28, 1964, Ser. No. 399,740
7 Claims. (Cl. 176—86)

The present invention relates to a new and improved reactivity control rod for use in nuclear reactors. The present invention is particularly concerned with control rods which contain materials being irradiated to produce usable radio isotopes for industrial and medical uses. In a specific form of the invention radioactive cobalt 60 is produced by irradiation of wafers containing cobalt 59 which wafers are positioned on the exterior of a tubular control rod.

The present invention also provides an improved control rod which may be directly substituted for a conventional control rod without changing the reactivity characteristics of the nuclear reactor.

In accordance with the present invention a control rod comprises an elongated tubular member having affixed thereto a head section and a roller section, said tubular member being provided with a plurality of channels equally spaced about the circumference of said tube on the exterior thereof, and adapted to retain material to be irradiated.

In drawings which illustrate an embodiment of the invention,

FIGURE 1 is a perspective view of a control rod constructed in accordance with the present invention, FIGURE 2 is a perspective of the head end of the control rod of FIGURE 1, FIGURE 3 is a perspective view of the roller end of the control rod of FIGURE 1, FIGURE 4 is a cross-section of the tube portion of the control rod of FIGURE 1, FIGURE 5 is a cross-section of the lower collar, FIGURE 6 is a plan view of the sleeve, FIGURE 7 is a cross-section of the sleeve, FIGURES 8A and 8B are views of the spring unit, and FIGURE 9 is a perspective drawing of a cobalt wafer.

Referring to FIGURE 1 there is shown in perspective a new and improved control rod constructed in accordance with the teachings of the present invention. A control rod assembly of the invention is shown at 10 in FIGURE 1 and consists of the head end portion 11, a roller section 12 and a tube portion 13. All of these parts of the control rod assembly 10 are tubular so that the control drive screw (not shown) may pass through the centre of the control rod. The tube 13 is provided with pairs of rails 14 which form longitudinal spaces in which wafers 15 of substances being irradiated are retained. As illustrated in FIGURE 1 a spring unit 16 may be provided at the head end of each column of wafers to urge the wafers toward the roller section and maintain them in tightly packed relation. In general the head unit 11 consists of a lower collar 17 and an upper collar 18 between which a slotted sleeve 19 is held and adapted to rotate on the tube 13. The slot 20 in the sleeve 19 may be positioned as explained in more detail hereafter to permit wafers to be added to or removed from the control rod assembly 10. Means are also provided to lock the sleeve 19 from accidental rotation and release of wafers during use of the control rod assembly 10.

FIGURE 2 is a perspective illustrating the head end 11 of the control rod 10 of FIGURE 1. The tube 13 may be seen extending beneath the sleeve 19. Collars 17 and 18 are affixed to the tube 13 by suitable means such as by welding. The collar 17 is provided with slots not clearly visible in FIGURE 2 which are aligned with the space between the rails 14 to permit wafers 15 or spring 16 to be positioned between the rails 14. As shown in FIGURE 2 the sleeve 19 is provided with a slot 20 of a length at least long enough to allow a wafer to be inserted in the slot 20 flat against the tube 13. The slot 20 is not continuous from one edge of the sleeve 19 but rather includes a recessed portion 21 beneath which wafers 15 may be passed when the slot 20 is aligned with a column of wafers between a pair of rails 14 so that wafers may be lodged in the column. The end of the slot 20 adjacent the collar 18 is provided with a ramp 21' which provides a sloping face against which wafers on being removed may be urged to cause the end of the wafer to rise above the slot 20.

In accordance with an important feature of the invention the sleeve 19 is provided with means to lock the sleeve 19 in a predetermined position to prevent the accidental loss of wafers 15 during the use of the control rod assembly 10. This locking feature comprises a recess 22 formed in the edge of the sleeve 19 adjacent the collar 17. In the locked position the end of a spring unit 16 is engaged in the recess 22 and prevents the rotation of the collar 19 until the end of the spring unit 16 is ejected from the slot 22 by suitable means urging the unit 16 away from the head end of the control rod. As illustrated a pair of semi-circular portions are included in the recess 22 in which suitable tools may be inserted for unlocking the rotating sleeve 19 to allow the slot 20 to be positioned over a column of wafers 15 for removal or insertion of wafers therein.

FIGURE 3 illustrates in further detail the roller section 12 of a control rod of the present invention. The roller section 12 is connected to the tube 13 by any suitable means such as welding and includes three rollers 23, two of which may be seen in FIGURE 3. The rollers 23 are equally spaced about the circumference of the roller section 12, and each roller is mounted on a resilient arm 24 fastened to the interior of the roller section 12 by any suitable means such as by rivets 25. In use when the control rod of the present invention is inserted in a control rod conduit in the reactor lattice the rollers 23 engage the walls of the conduit and serve to stabilize the lower end of the control rod during use. Also as shown in FIGURE 3, a column of wafers 15 are shown between a pair of rails 14 and resting against a lower end stop 26.

FIGURE 4 is a transverse cross-section of the tube 13 showing the rails 14 retaining wafers 15 in three equally spaced columns about the periphery of the tube 13.

FIGURE 5 is an end view of the collar 17 which is attached to the tube 13 during assembly of the control rod. The collar 17 is provided with slots 27 which are aligned with the channels between pairs of rails 14 to permit wafers 15 and spring units 16 to be entered into the channels beneath the collar 17. It should be noted that the edges 28 of the slots 27 are chamfered to facilitate the passage of wafers through the slots 27. Holes 29 are shown drilled in the collar 17 through which the collar may be flush welded to the tube 13 during assembly of the control rod.

FIGURE 6 is a plan view of an alternative form of collar 19 similar to the collar 19 illustrated in FIGURE 1. The significant difference is that in FIGURE 6 the collar 19 is provided with an end ring 30 to provide increased strength for the end of the sleeve 19 adjacent the lower collar 17 in the assembled control rod (see FIGURE 2). In FIGURE 6 the slot 20 may clearly be seen together with the ramp 21 and the locking recess 22. The sleeve 19 is tubular in shape and is adapted to be a sliding fit on the tube 13 permitting rotation of the sleeve 19 about the tube 13.

FIGURE 7 is a cross-section on the line 7—7 of FIGURE 6 clearly showing the construction of the sleeve 19.

As shown in FIGURE 7 the sleeve 19 is internally recessed to provide a larger diameter except in the areas 31 and 32 so that friction between the sleeve 19 and the tube 13 is reduced. Further, as illustrated in FIGURE 7, recesses 33 may be provided spaced circumferentially about the interior surface of the sleeve 19 in the area 32 in which bearing materials may be inserted to provide for a further reduction in friction between the sleeve 19 and the tube 13 and to prevent jamming during operation.

FIGURES 8A and 8B illustrate the structure of the spring units 16 shown in FIGURE 1. This spring unit 16 is provided with an upper end 34 and a lower end 35 as well as with a spring portion 36. The whole of the spring unit is shaped to conform to the curvature of the outer surface of the tube 13 so that it will nest smoothly against the tube 13 in use. The lower end 35 is adapted to press against the wafers 15 of each column to ensure that they remain immobile in the channel during use and the end 34 is adapted to engage the recess 22 to lock the sleeve 19 in a predetermined position to prevent accidental movement of any of the wafer 15 in use.

FIGURE 9 is a perspective view of a wafer for use in the present invention which may be seen to be shaped to conform to the tube 13. The wafer 15 may be constructed from aluminum and may contain nickel plated cobalt pellets which when irradiated in the nuclear reactor are transformed into cobalt 60, a powerful and highly useful source of radiations. The size and shape of the wafers 15 may be varied in accordance with varying requirements for producing different quantities of radioactive substances in the control rod.

A control rod constructed following the teachings of the present invention and suitable for use in the NRU reactor at Chalk River, Ontario, Canada, is 9 feet, 11 5/16 inches in overall length, each column of wafers containing 12 8 inch wafers, each wafer containing 14.7 grams of cobalt in the form of nickel plated sintered pellets encased in aluminum. Thus 36 wafers per control rod provides 530 grams of cobalt which may be converted into cobalt 60 source material at 200 curies per gram having a value of approximately $150,000. The tube 13 is made of Zircalloy II to Atomic Energy of Canada Limited specification Met 59. The rails 14 and the collars 17 and 18 are formed of Zircalloy II as well, and the sleeve 19 is formed of stainless steel. The spring units 16 may be formed with the springs 56 of Inconel X or stainless steel and with upper and lower end pieces 34 and 35 of stainless steel.

The new and improved control rod of the present invention is adapted to replace conventional control rods in a nuclear reactor, and to produce the maximum possible amount of cobalt 60 without changing the reactivity factor of the control rod over conventional control rods.

The present invention provides a control rod assembly having significant advantages over prior control rods used for the production of radioactive isotopes and will result in the production of such isotopes much more quickly and inexpensively than was possible with prior control rods.

We claim:

1. A control rod for a nuclear reactor comprising an elongated tubular member having a head section affixed to one end and a roller section affixed to the other end, said tubular member being provided with a plurality of longitudinally extending channels equally spaced about the circumference of said tube on the exterior thereof, said channels retaining cobalt containing wafers.

2. A control rod according to claim 1 wherein said channels are defined by a pair of rails.

3. A control rod according to claim 1 wherein three channels are spaced about said tubular portion.

4. A control rod according to claim 1 in which said tubular portion is formed of a zirconium alloy.

5. A control rod according to claim 2 wherein said rails are formed of a zirconium alloy.

6. A control rod according to claim 1 wherein said head section comprises upper and lower collars fixed to said tubular member and retaining therebetween a sleeve coaxial with and rotatable about said tubular member, said sleeve having a slot having the same breadth as a channel and including means to lock said slot out of alignment with a channel.

7. A control rod according to claim 6 wherein said slot in said sleeve extends along a major portion of the length of said sleeve.

References Cited

UNITED STATES PATENTS 2,768,134 10/1956 Fermi et al. _____ 250—106
3,088,898 5/1963 Busby et al. _____ 176—93

FOREIGN PATENTS 1,270,050 7/1961 France.
1,163,465 2/1964 Germany.

L. DEWAYNE RUTLEDGE, *Primary Examiner.*

H. E. BEHREND, *Assistant Examiner.*